Jan. 2, 1968   E. G. AKERS   3,361,152
KEG VALVE
Filed Oct. 2, 1964   2 Sheets-Sheet 2
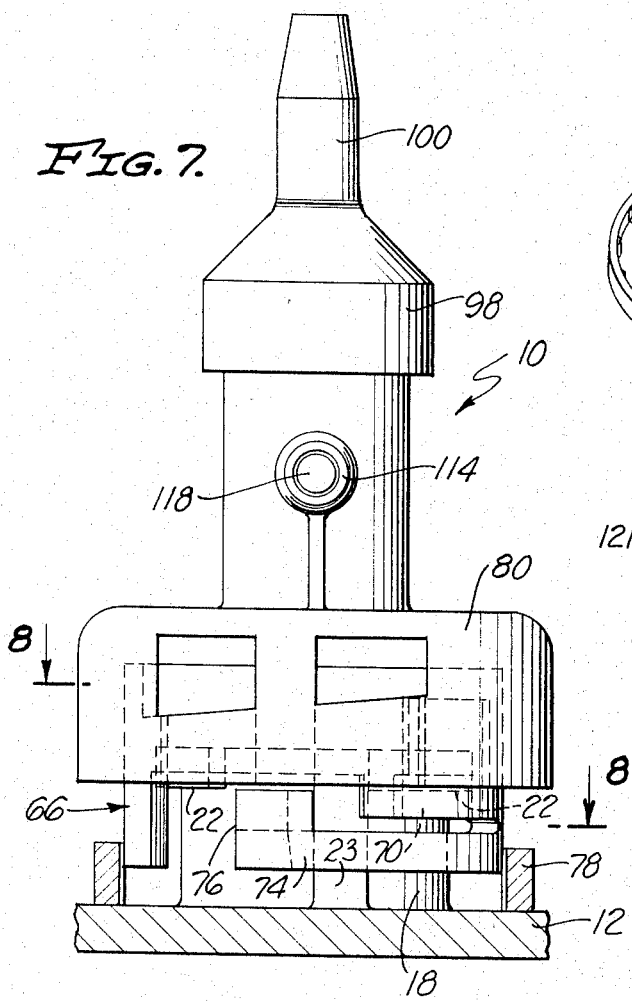
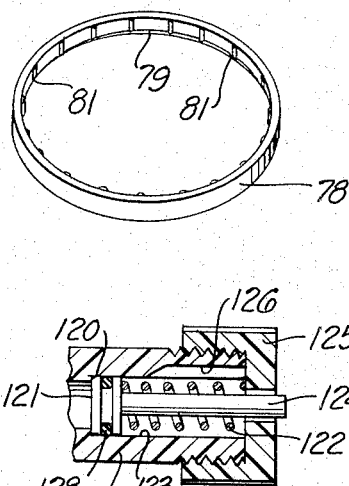
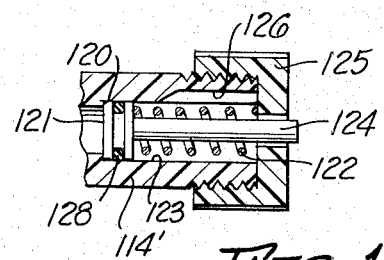
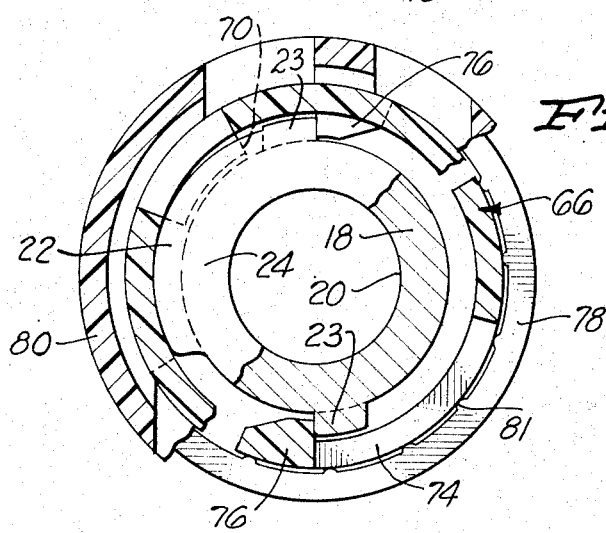
INVENTOR.
EDWARD G. AKERS
BY
EDWARD D. O'BRIAN
ATTORNEY

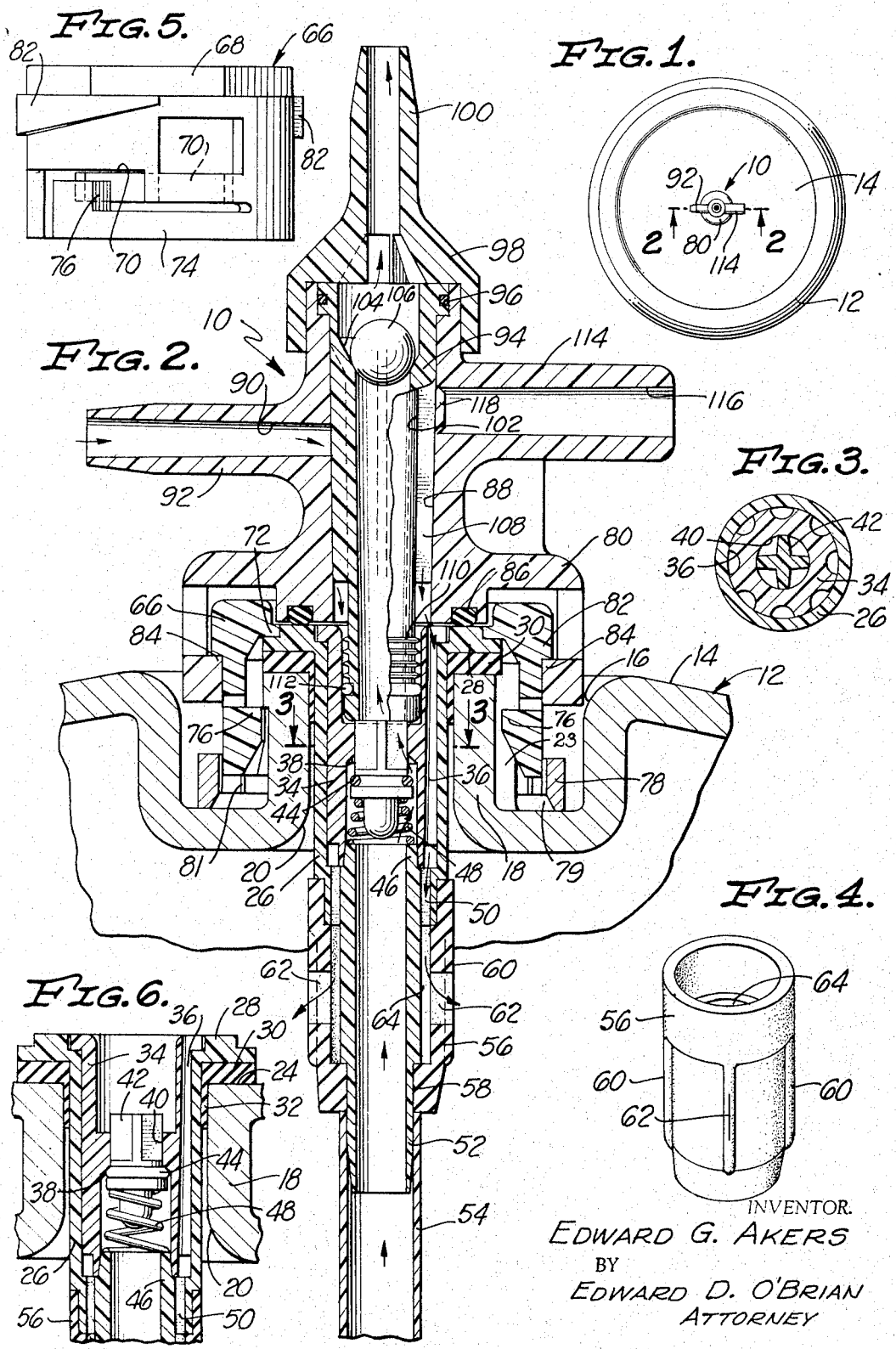

3,361,152
KEG VALVE
Edward G. Akers, Downey, Calif., assignor to Polytop Corporation, Slatersville, R.I., a corporation of Massachusetts
Filed Oct. 2, 1964, Ser. No. 400,999
6 Claims. (Cl. 137—212)

This invention is directed to a beer valve, a portion of which is semi-permanently installed in a keg, while the balance is retained in the tavern and arranged so that the two a keg valve of a type sometimes referred to as portions interlock and cooperate so as to prevent loss of beer and easy connection.

Ever since beer has been brewed, and has been stored in kegs, means have been devised for the extraction of beer from the kegs and the dispensing thereof. These means have been in many different embodiments from simple wooden tap valves to complex sliding structures. In each case difficulty has been experienced. The difficulties range from inadequate pressure in the keg to be able to draw the entire contents thereof to leakage and squirting of beer when the tapping structure is inserted into the keg.

Accordingly it is an object of this invention to provide a beer valve arranged to be associated with the keg structure in such a manner that connections are readily made to a keg of beer without leakage, loss and squirting so that tapping of the beer keg is easily managed. It is another object of this invention to provide a beer valve having a portion thereof in semi-permanent association with the beer keg so that this portion maintains the beer within the keg without leakage and is arranged for the connection of the portion normally retained within the tavern with ease and expediency. It is another object of this invention to provide a two portion beer valve of inexpensive and reliable construction so that it is economically feasible to equip every beer keg with such equipment. It is a further object of this invention to provide a beer valve which is economic of construction, easy and foolproof to use, free of maintenance and of a long service life.

Other objects and advantages of this invention will appear from the following portion of the specification, the claims and the drawings in which:

FIG. 1 is a top plan view of the beer valve of this invention shown installed in a beer keg;

FIG. 2 is an enlarged section taken generally along the line 2—2 of FIG. 1;

FIG. 3 is a section taken along the line 3—3 of FIG. 2;

FIG. 4 is an isometric view of the air outlet valve sleeve;

FIG. 5 is a side elevational view of the keg nut;

FIG. 6 is a sectional view, similar to a portion of the section of FIG. 2, showing the keg valve in the closed position;

FIG. 7 is a side elevational view of the beer valve of this invention viewing the valve at substantially right angles with respect to FIG. 2;

FIG. 8 is a staggered section taken generally along the line 8—8 of FIG. 7 with parts broken away;

FIG. 9 is an isometric view of the lockring; and

FIG. 10 is an elevational sectional view of a modified form of the over pressure release.

As an aid to understanding this invention it can be stated in essentially summary form that it is directed to a keg or beer valve having two main portions. One portion interlocks with the beer outlet structure on the standard beer keg and it is semi-permanently installed with respect to the outlet structure of the keg and remains therein when the keg is returned to the brewery for cleaning and refilling. This structure has a liquid valve therein to prevent loss of beer during filling, transit and storage, prior to use of the contents of the keg. The other portion of the beer valve structure comprises a portion that is retained in the tavern. It interlocks with the portion remaining in the keg and opens the valve in the keg so that the contents of the keg can be withdrawn. Compressed gas inlet means is provided in the tavern portion, together with passages that permit the gas to enter the keg to drive out its liquid contents. A compressed gas valve is also provided in the keg portion of the beer valve to prevent liquid or gas leakage from the keg during filling, transit and storage. Suitable locking mechanism and seal means is provided between the keg portion of the keg, and the tavern portion and the keg portion, so that leakage is eliminated. Over pressure means is also provided to prevent over pressure from damaging the structure. Non-return means is also provided to prevent return of liquid to the interior of the keg.

This invention will be understood in greater detail by reference to the following portion of the specification, wherein the drawings are referred to. Referring now to FIG. 1, the beer valve of this invention is generally inidcated at 10. In that figure the beer valve 10 is shown as mounted on a standard, conventional metallic beer keg 12. As is seen in FIG. 2, the beer keg 12 has an outwardly domed top 14 which is provided with a circular recess 16 in which is located beer keg outlet nozzle 18. The nozzle 18 has an interior passage 20, of generally cylindrical configuration, which accepts the portion of the beer valve 10 of this invention. The outlet nozzle 18 is of generally cylindrical configuration inside and out and is provided with lugs 22 arranged for the securement of the beer valve 10 to the keg 12. Top end 24 of nozzle 18 is of suitable configuration for ease of sealing thereagainst.

Valve member or body 26 is of generally cylindrical configuration so as to fit within the interior passage 20 and extend into the interior of beer keg 12. Valve body 26 carries flange 28, see FIG. 6, which is positioned to be associated with the top end 24 of the nozzle 18 and gasket 30 is positioned therebetween to provide proper sealing. The upper portion of gasket 30 is of generally flat configuration, and has a cylindrical skirt 32 which has an interior hole to engage upon the exterior of valve body 26. The skirt 32 extends downwardly between passage 20 and valve body 26 to prevent the gasket 30 from extruding from sealing relationship between outlet nozzle 18 and valve body 26. Gasket 30 is preferably of highly resilient material so as to provide porper sealing characteristics.

Positioned within the interior bore of valve body 26 is valve seat member 34. As is seen in FIG. 3, valve seat member 34 has a plurality of generally axially oriented grooves 36 to permit the passage of gas between the valve body 26 and the valve seat member 34. Valve seat member 34 has a valve seat 38 therein. Valve seat 38 is of generally conical configuration on the axis of valve body 26 and valve seat member 34. An axially aligned cylindrical guide 40 is positioned adjacent the valve seat 38 and valve 42 is positioned within the guide 40 to be guided thereby. Valve 42 is provided with a valve disc in the form of a seal ring 44 which is arranged to be engageable with the valve seat 38 for intimate engagement therewith and closure of the passage past the cylindrical guide wall 40. It is to be noted that the valve 42 closes in the upward direction so that pressure on the bottom thereof, as is seen in FIGS, 2, 6 and 7, causes closing of the valve disc 44 more tightly against seat 38.

The valve body 26 extends downwardly and forms a nipple 46 extending up into the interior of the bottom end of valve seat member 34. Such nipple seals with the valve seat member 34 to furnish a continuation of the passage therethrough and serves as a seat for spring 48 which engages thereagainst and against the under side of valve 42 to urge the valve 42 toward its closed position. Holes 50 through this portion of the valve body 26 permit continuity of air passage from the grooves 36. The valve body 26 extends further downwardly to terminate in a hose nipple 52 to which a flexible tube 54 is secured. Tube 54 serves as a dip tube and extends to the bottom of the keg, and is preferably sufficiently long so as to extend to the very lower most portion of the keg 12 to permit the beer valve 10 to empty all of the liquid contents thereof. Flexible tube 54 is preferably sufficiently flexible and of such material as to prevent it from being damaged by washing and/or filling equipment which may be inserted through another bung hole in the keg 12. The valve body 26, valve seat member 34, valve 42 and flexible tube 54 are preferably made of polymer composition materials of such nature as to not contaminate beer in the keg 12, resist abrasion and the temperatures encountered in the service of beer keg 12.

Air valve 56, see FIGS. 2 and 4, is a generally cylindrical sleeve formed of relatively rubber like material and is positioned around the valve body 26, embracing it in fluid tight relationship above the outlet of air holes 50. Shoulder 58 on air valve 56 is secured to the lower end of valve body 26 just above the hose nipple 52 and is preferably cemented thereto to prevent leakage. Ribs 60 are externally formed on the air valve 56 and each rib 60 has an axially aligned slit 62 formed therein from the interior to the exterior thereof. Each of these slits 62 serves as an individual air valve which permits air under pressure delivered through grooves 36 and holes 50 to the interior space 64 of the air valve 56 to pass through in the outward direction. However, external pressure on the ribs 60 urges the slits 62 closed to prevent passage of gas or liquid in the interior of keg 12 to the exterior thereof through these slits.

Valve body 26, and its associated previously described parts, are secured to the keg 12 by means of keg nut 66, see FIGS. 2, 5, 7 and 8. Keg nut 66 has wrenching surface 68 on the upper external portion thereof so as to aid in turning it upon the lugs 22 of keg 12. Appropriate cooperating lugs 70 are formed on the interior surface of the keg nut 66 so as to cooperate with the lugs 22 so the keg nut is held downwardly upon the keg 12. Interior flange 72 engaged with the top of flange 28 on valve body 26 to urge the valve body downward against the top end 24 of nozzle 18 and to compress gasket 30 therebetween for proper sealing. By this means sealing of the valve body 26 is accomplished with respect to the keg 12. In order to prevent inadvertent loosening of keg nut 66 it is provided with circumferentially directed locking fingers 74 with locking dogs 76 positioned on the end thereof. Locking dogs 76 are appropriately positioned and of such configuration as to snap over the axially extending radial ribs 23 on lugs 22 on keg 12 when the keg nut 66 is tightened on the keg. The nut 66 is also of polymer composition material of such nature as to be resistant and resilient so that the locking dogs 76 snap into position behind the ribs 23. In order to securely hold the locking dogs 76 in place behind the ribs 23 lock ring 78 is provided therearound. Lock ring 78 may be of metallic or polymer composition material and so dimensioned that it fits within recess 16 and reasonably closely engages the exterior of keg nut 66 after the locking dogs are snapped in place behind the ribs 23. Lock ring 78 has a chamfered lower edge 79 to aid in its installation and has hemicylindrical lugs 81 on its inner surface to aid in its frictional engagement with the outer surface of locking fingers 74. The presence of lock ring 78 thus prevents spreading of locking dogs 76 so that it is impossible for the keg nut 66 to rotate and become loose.

The above described structure is semi-permanently installed in the keg 12 and is sent from the brewery with keg 12 filled with beer. The seating of valve disc 44 against valve seat 46 prevents leakage of beer or the gaseous fluid above beer out of the keg 12 through the internal passageway, and the self-closing slits 62 in air valve 56 prevent escape of the contents of the keg 12 through the holes 50 and grooves 36. Accordingly the keg is fully sealed. The structure is such that when the empty keg is returned to the brewery the keg can be cleaned through a side bung hole without need for disturbing the semi-permanently installed keg portion of the beer valve of this invention. Thus, the keg 12 can be cleaned and again refilled at the brewery. Filling can either be accomplished by appropriate equipment through the valve body 26, or the keg may be filled through its additional bung hole.

The tavern portion of the beer valve 12 comprises tavern nut 80. Keg nut 66 has appropriate formed locking lugs 82 on the unit or exterior surface thereof and tavern nut 80 has appropriate cooperating surfaces 84 for engagement and locking therewith. Thus, the tavern nut can be inserted over and locked to the keg nut 66. Tavern nut 80 is provided with an appropriate seal ring 86 so that sealing is accomplished between flange 28 and the lower side of the tavern nut 80.

Passage 88 is axially formed on the interior of tavern nut 80 and gas inlet 90 is formed as a nipple 92 for the connection of a gas supply thereto. Thus, gas may be communicated through gas inlet 90 to the interior of passage 88 and thus to the grooves 36, as is seen in FIG. 2.

Probe 94 is positioned in passage 88 and secured therein. Probe 94 is sealed with respect to the passage 88 by means of a ring seal 96 and is secured therein by the means of cap 98 which has a beer outlet nipple 100.

Probe 94 is formed with an interior passage 102 which is larger at its upper end and forms a valve seat 104. Valve ball 106 is positioned therein, and is retained by cap 98. Valve ball 106 is capable of seating against seat 104 to prevent flow of liquid from the interior of beer outlet nipple 100 in the downward direction into the interior passage 102. Thus, materials above ball 106 cannot pass into the keg 12. The lower end of probe 94 extends downwardly and is positioned to engage the upper end of valve 42 to force it off of its seat 38 when the tavern nut 80 is installed upon the keg nut 66. Thus, installation of tavern nut upon the keg nut causes opening of valve 42 so that a passage, in the upward direction only, is secured from the interior of keg 12 to the beer outlet nipple 100.

The exterior of probe 94 is provided with axially aligned fins defining grooves 108 which permit communication from the gas inlet 90, around the exterior or probe 94 to the grooves 36 to permit gas flow from the nipple 92 to the interior of keg 12 through slit 62. In order to prevent gas flowing downwardly around the probe 94 from mixing with beer flowing upwardly within the probe 94, the lower end of probe 94 is provided with labyrinth flanges 110 and ring seal 112 which seal between the exterior of the lower end of the probe 94 and the interior of valve seat member 34. In view of the fact that either the flanges 110 or ring seal 112 provide adequate sealing, either can be omitted if desired.

Tavern nut 80 is provided with handle 114 to aid in locking the tavern nut 80 upon the keg nut 66. Handle 114 has an interior passage 116 which terminates in an integral plug 118 which is joined with the remainder of the tavern nut 80 by a reduced section. This section is calculated in such a manner that should gas pressure become excessive within the passage 90, the plug 118 will blow out before there is danger of rupture of the keg 12.

As is shown in FIG. 10 in an alternative construction in the handle 114' has a valve stop 120 adjacent at its outer end. Piston 121 is urged toward stop 120 by spring 122 and is guided in bore 123 by rod 124 which extends through an enlarged hole in cap 125. Bore 123 has a slot 126 extending from cap 125 part way to stop 120. Piston 121 is sealed with respect to bore 123 by ring seal 128. When gas pressure is not excessive piston 121 moves away from stop 120, but does not move to slot 126, so the relief valve remains closed. When keg pressure rises, the piston 121 passes the end of slot 126 so that gas is relieved. The amount rod 124 extends out of cap 125 is a measure of pressure and may be marked, if desired.

In use, the full keg is shipped to the tavern with the tavern nut 66 installed and all of the parts retained thereby in place. The tavern nut 80 has its beer outlet nipple 100 connected by means of a flexible conduit to a beer dispensing valve. There upon, the tavern nut 80 is installed upon the keg nut 66 and a supply of gas under pressure is connected to nipple 92. Compressed air under relatively low pressure, or carbon dioxide are usually used for this purpose and only a few pounds per square inch are necessary to force the beer out of keg 12 at an adequate rate. Should several kegs 12 be connected in parallel to supply one or more beer dispensing valves and should the gas pressure at nozzle 92 fail, the beer cannot return to the keg from the outlet nipple 100 because of check valve 106. It can be seen from this construction that the tavern valve 80 is readily installed and removed from the keg nut 66 and that only after ring seal 112 is inserted in the interior of valve seat member 34 is the valve 42 forced open. Therefore, no beer escapes when the tavern nut 80 is installed. Similar to the materials of the keg nut 66, the tavern nut 80 and its associated parts are preferably made of polymer composition material of such nature as to not contaminate the beer and to withstand the rigors of service.

It is clear that the beer valve described herein above is susceptible to numerous modifications and changes without the exercise of the inventive faculty and accordingly the scope of this invention is defined by the scope of the following claims. In particular it is to be noted that this invention has been described in its preferred embodiment with respect to a beer dispensing valve particularly suited for securement to a beer keg. It is clear that the valve of this invention is suited for the dispensing of other fluids than beer and it is applicable to other vessels than beer kegs.

What is claimed is:

1. A structure securing a keg valve to a keg, said keg having a cylindrical neck, said neck having a top and neck lugs extending outwardly from said neck adjacent to said top, said neck having axial ribs extending therefrom, said ribs being off-set from said neck lugs, wherein the improvement comprises:

a keg nut which is substantially cylindrical, said keg nut having an end overlying said top, nut lugs extending inwardly on said keg nut beneath said neck lugs, a plurality of arcuately extending resilient fingers forming a part of the cylindrical portion of said keg nut, each of said fingers having an inwardly extending locking dog at its end fitting against one of said ribs, each of said dogs having a cam surface adapted to engage one of said ribs on rotation of said keg nut so as to spring the finger upon which it is located outwardly so that said dog fits behind said rib; and means for conveying fluid adapted to be coupled between the keg neck and the top of said keg nut by attachment of said keg nut to said keg neck.

2. A structure as claimed in claim 1 wherein said means for conveying fluid comprises a valve member, said valve member having a valve body fitting within said neck and a flange extending outwardly from said valve body, said flange fitting between said top of said keg neck and the end of said keg nut so as to be secured to said keg.

3. A structure as claimed in claim 2 including gasket means for forming a seal located between the top of said keg neck and said flange.

4. A structure as claimed in claim 2 including means located on said keg nut for coupling a unit to said keg nut.

5. A structure as claimed in claim 2 wherein said valve member includes a liquid valve and a gas valve, said liquid valve normally closing said valve member against the passage of liquid outwardly through said neck and being capable of being opened so as to permit liquid to pass outwardly through said neck, said gas valve being capable of admitting gas inwardly through said keg neck.

6. A structure as claimed in claim 5 including means located on said keg nut for coupling a unit to said keg nut, and including a unit coupled to said keg nut, said unit including means for opening said liquid valve.

References Cited

UNITED STATES PATENTS

| | | | |
|---|---|---|---|
| 535,880 | 3/1895 | Anderson | 285—88 |
| 2,468,849 | 5/1949 | Trainor | 285—314 |
| 3,014,740 | 12/1961 | Bogosian | 285—82 |
| 3,156,252 | 11/1964 | Johnston | 137—212 |
| 3,228,413 | 1/1966 | Stevens | 222—400.7 X |
| 3,231,154 | 1/1966 | Johnston | 222—400.7 |

ALAN COHAN, *Primary Examiner.*